United States Patent
Yasuda et al.

(10) Patent No.: US 6,656,982 B2
(45) Date of Patent: Dec. 2, 2003

(54) WOODY THERMOPLASTIC RESIN COMPOSITION

(75) Inventors: Naoki Yasuda, Kawasaki (JP); Yoshihito Anzai, Kawasaki (JP); Hirokazu Ohno, Kawasaki (JP); Shigeto Yoshimura, Kawasaki (JP); Michihiro Kubo, Kawasaki (JP)

(73) Assignee: Ajinomoto Co., Inc., Tokyo (JP)

( * ) Notice: Subject to any disclaimer, the term of this patent is extended or adjusted under 35 U.S.C. 154(b) by 169 days.

(21) Appl. No.: 09/933,658

(22) Filed: Aug. 22, 2001

(65) Prior Publication Data

US 2002/0049266 A1 Apr. 25, 2002

(30) Foreign Application Priority Data

Aug. 22, 2000 (JP) ........................................ 2000-251253

(51) Int. Cl.$^7$ .............................. C08L 97/02; C08K 3/26
(52) U.S. Cl. ........................... 524/14; 524/13; 524/425; 524/426; 524/427
(58) Field of Search ............................ 524/13, 14, 425, 524/426, 427

(56) References Cited

U.S. PATENT DOCUMENTS 2,926,100 A * 2/1960 Weigle et al. ............... 427/194

FOREIGN PATENT DOCUMENTS

| JP | 63-202661 A | 8/1988 |
| JP | 11-060830 A | 3/1999 |

* cited by examiner

Primary Examiner—Peter Szekely
(74) Attorney, Agent, or Firm—Oblon, Spivak, McClelland, Maier & Neustadt, P.C.

(57) ABSTRACT

There is disclosed a woody thermoplastic resin composition which prevents the occurrence of rust on the metal surface in a molding machine and suppresses the generation of a volatile substance as encountered when a woody thermoplastic resin composed of a thermoplastic resin and wood flour was subjected to heat molding and processing.

According to the present invention, a specific amount of dolomite is added to a woody thermoplastic resin composed of a thermoplastic resin and wood flour thereby there may be obtained a woody thermoplastic resin composition which has an effect to prevent the occurrence of rust on the metal surface in a molding machine during the molding and processing and to suppress the generation of a volatile substance.

26 Claims, No Drawings

WOODY THERMOPLASTIC RESIN COMPOSITION

The present invention relates to a woody thermoplastic resin composition which is prepared by incorporating a certain specific additive into a woody thermoplastic resin comprising a thermoplastic resin and wood flour and which may be widely utilized in the fields where wood-like appearance is required.

PRIOR ART

A wood has been extensively used as a construction material. However, the articles made from wood have disadvantages in their inherent nature of combustibility, durability, weather resistance, etc. Also, an environmental disruption by deforestation has become a serious problem. Under these circumstances, it is well known that a molded article having a wood-like appearance may be prepared from a mixture of a thermoplastic resin and wood flour as wood replacement. In recent years, there have been an increase in the case where wood flour-containing thermoplastic resin is used as the interior and exterior materials for house such as floor, ceiling, banister, window frame, doorframe, veranda and the like.

However, wood flour-containing thermoplastic resin causes problems of forming rust on the surface of metals such as screw, cylinder, mold, etc. in the molding machine during molding possessing such as extrusion molding or injection molding. In addition, volatile substance such as the decomposition product of the resin, water and the like generate during molding processing to cause problems of foaming the molded article and forming silver stripe on the surface of the molded article. To prevent these problems the following techniques were already proposed.

(1) A technique for prevent rust by a method which comprises incorporating at least one compound selected from the group consisting of hydrotalcites, zeolites, alkaline earth metal oxides or carbonates salts, fibrous magnesium oxysulfates, metal salts of hydrofatty acids and hindered amine light stabilizers into a polyolefin composition comprising a polyolefin and a plastic modifying agent mainly consisting of waste paper pulp (Japanese Patent Laid-Open No. Hei 11-60830). Among alkaline earth metal oxides or carbonates salts for use in said technique, oxide or carbonate of magnesium and calcium are the constituent ingredients of dolomite involving in the present invention. However, there is neither description nor suggestion in said prior art reference with respect to not only dolomite which is a magnesium-calcium complex salt for use in the present invention but also rust preventive effect to be caused when dolomite was incorporated into a woody thermoplastic resin.

(2) A technique for suppressing the generation of volatile substances by a method which comprises incorporating rice hull into a thermoplastic resin composition containing a basic filler such as magnesium oxide, calcium oxide, calcium carbonate or calcium hydroxide (Japanese Patent Laid-Open No. Sho 63-202661). Although a basic filler such as magnesium oxide, calcium oxide, calcium carbonate or calcium hydroxide for use in said technique are the constituent ingredients of dolomite involving in the present invention, there is neither description nor suggestion in said prior art reference with respect to not only dolomite which is a magnesium-calcium complex salt for use in the present invention but also volatile substances-suppressing effect to be caused when dolomite was incorporated into a woody thermoplastic resin.

There was practically incorporated into a woody thermoplastic resin composed of wood flour and thermoplastic resin an element selected from hydrotalcites, zeolites, alkaline earth metal oxides or carbonates salts, fibrous magnesium oxysulfates, metal salts of hydrofatty acids and hindered amine light stabilizers disclosed in Japanese Patent Laid-Open No. Hei 11-60830 and further the basic filler disclosed in Japanese Patent Laid-Open No Sho 63-202661. As the results, in any case the rust preventive effect and volatile substance-reducing effect could not be achieved sufficiently.

SUMMARY OF THE INVENTION

An object of the present invention is to provide a woody thermoplastic resin composition (a wood flour-containing thermoplastic resin composition) which can prevent the rusting on the surface of metals including screw, cylinder and mold in the molding machine and at the same time which can suppress the generation of the volatile substances during heat molding processing such as extrusion molding and injection molding.

As a result of having ardently studied to achieve the above object, the present inventors have found that a thermoplastic resin composition comprising incorporating a specific amount of dolomite into a woody thermoplastic resin composed of a thermoplastic resin and wood flour in a specific ratio has excellent effect to prevent the occurrence of rust on the surface of metals including screw, cylinder and mold in the molding machine and to suppress the generation of volatile substance during molding processing such as extrusion molding and injection molding. The present invention is based on the above finding.

That is, the present invention is a thermoplastic resin composition which comprises (A) 100 parts by weight of a thermoplastic resin, (B) 5–150 parts by weight of wood flour, and (C) 0.01–20.0 parts by weight, based on the total of the components (A) and (B), of dolomite and which has excellent rust-preventive effect on the surface of metals including screw, cylinder and mold in the molding machine and volatile substances-reducing effect during molding processing such as extrusion molding and injection molding.

Also, by using a thermoplastic resin composition which comprising (A) 100 parts by weight of a thermoplastic resin, (B) 5–150 parts by weight of wood flour, and (C) 0.01–20.0 parts by weight, based on the total of the components (A) and (B), of natural dolomite and/or a synthetic dolomite consisting of magnesium carbonate-calcium carbonate, the rust preventive and volatile substances-reducing effects may be enhanced.

Also, a thermoplastic resin composition comprising (A) 100 parts by weight of a thermoplastic resin, (B) 5–150 parts by weight of wood flour, and (C) 0.01–20.0 parts by weight, based on the total of the components (A) and (B), of dolomite consisting of magnesium carbonate-calcium carbonate complex salt in which the weight ratio of magnesium to calcium is 5:95–95:5 in terms of MgO:CaO exerts the increased rust preventive and volatile substances-reducing effects.

Furthermore, a thermoplastic resin composition comprising (A) 100 parts by weight of a thermoplastic resin, (B) 5–150 parts by weight of wood flour, and (C) 0.01–20.0 parts by weight, based on the total of the components (A) and (B), of light burned dolomite prepared by light burning a dolomite consisting of magnesium carbonate-calcium carbonate complex salt in which the weight ratio of magnesium to calcium is 5:95–95:5 in terms of MgO:CaO exerts significantly increased rust preventive and volatile substances-reducing effects.

A thermoplastic resin for use in the present invention may be one which is usually being used. Examples of the thermoplastic resin include polyvinyl chloride, vinyl chloride-related resin such as chlorinated polyvinyl chloride, styrene-related resins such as polystyrene(PS), high-impact polystyrene(HIPS), syndiotactic polystyrene, acrylonitrile-butadien-styrene copolymer (ABS resin), acrylonitrile-butadien-styrene-($\alpha$-methyl) styrene copolymer, acrylonitrile-styrene copolymer (AS resin), acrylonitrile-ethylene-styrene copolymer (AES resin), acrylonitrile-acrylic rubber-styrene copolymer (AAS resin) and the like; polyesters such as poly(ethylene terephthalate), poly(butylene terephthalate), polyacrylate and the like; polyamides such as nylon 6, nylon 12, nylon 66, nylon 610, nylon 612, nylon MXD6 and the like; polycarbonate, polyacetal, vinyl acetate resin, ethylene- vinyl acetate resin, poly(vinyl alcohol), poly (vinyl acetal), polyphenylene oxide, polysulfone, polyether sulfone, polyphenylene sulfide, their blend resin (polymer alloy), etc.

Wood flour for use in the present invention may be one which is generally being used. Examples of wood flour include chip, shavings, sawdust derived from wood such as hemlock, cypress, cryptomeria, pine, lauan or the like. These wood flours are being supplied abundantly as by-product or waste from sawmill and woodworking plant.

The particle shape and size of wood flour for use in the present invention is not particularly limited so long as they are not adversely affected on the molding processing property and the quality of the molded article to be prepared. However, an average particle size of wood flour may be 30–500 $\mu$m, preferably 70–200 $\mu$m. When the average particle size is less than 30 $\mu$m or when it exceeds 500 $\mu$m a good wood-like appearance cannot be realized.

The amount added of wood flour for use in the present invention may be 5 to 150 parts by weight, preferably 20–100 parts by weight, based on 100 parts by weight of a thermoplastic resin. In the case that the amount added of wood flour is less than 5 parts by weight based on 100 parts by weight of a thermoplastic resin, it is difficult to obtain the characteristic properties close to natural wood, e.g. thermal expansivity, nail-driving characteristics, rigidity, feel such as touch, surface state, wood-like appearance and the like. Contrary thereto, In the case that the amount added of wood flour exceeds 150 parts by weight based on 100 parts by weight of a thermoplastic resin, there can be obtained the characteristic property close to natural wood, but wood flour is easily aggregated in a molten thermoplastic resin to cause problems of build-up and lowering in the physical property because wood flour and thermoplastic resin have poor compatibility and dispersibility each other.

As a dolomite for use in the present invention, it is not limited particularly. There can be used a natural dolomite which occurs widely in nature and which has been utilized as wall material, fireproof material for iron manufacture and the like. In addition, a synthetic dolomite may also be used whose chemical composition is a magnesium carbonate-calcium carbonate complex salt. The composition of the synthetic dolomite for use in the present invention may be one wherein the magnesium element and the calcium element are present in a certain mixture ratio, and it is preferable that the weight ratio of the magnesium component to the calcium component is in a range of from 5:95 to 95:5 in terms of MgO:CaO.

Also, these natural and/or synthetic dolomites may be subjected to burning or digestion to such an extent that the metal element composition is not altered greatly thereby the denatured derivatives may also be used. Specific examples of the denatured derivatives include dolomite cement prepared by heating natural dolomite at a temperature of 700–800° C., light burnt dolomite prepared by heating natural dolomite at a temperature of 900–1,000° C., dead burnt dolomite prepared by heating natural dolomite at a elevated temperature of 1,600–1,800° C., dolomitic slaked lime prepared by digesting light burnt dolomite in the presence of water, synthetic magnesite-dolomite clinker and the like.

Furthermore, there may be used the denatured derivatives of natural minerals and synthetic complex salts such as akermanite ($Ca_2MgSi_2O_7$), diopside [$CaMg (SiO_7)_2$], various kinds of slag to such an extent that the metal element composition is not altered greatly, the ratio of calcium to magnesium in said natural minerals and synthetic complex salts being in the same range as in the above described synthetic dolomite. Also, they may be used in optionally selected combination.

A natural dolomite, a synthetic dolomite and derivatives thereof are referred to as "dolomitic compound" collectively herein. These dolomitic compounds are being produced industrially widely in a large amount and used in a variety of fields including steel manufacture, earthenware, construction material and agriculture, and hence they are easily and cheaply available in a stable quality. Among them, especially light burnt dolomite and light burnt synthetic dolomite are preferred from a viewpoint of causing a good rust-preventive effect toward the metal surface and a good volatile substance-reducing effect during heat molding processing. In addition, dolomitic compound subjected to surface treatment with various surface treatment agents to improve the compatibility and dispersibility of dolomitic compound in wood flour containing thermoplastic resin are the most preferred from a viewpoint of causing excellent rust-preventive effect toward the metal surface and excellent volatile substance-reducing effect during heat molding processing.

As surface treatment agents involving in the present invention, organic acids, metal salts of organic acids, polyhydric alcohols and the like may be taken. These surface treatment agents may be used either individually or in optional combination.

As organic acids which may be used as surface treatment agent, there may be taken a saturated aliphatic monocarboxylic acid, a saturated aliphatic dicarboxylic acid, an unsaturated aliphatic carboxylic acid, a carbon cyclic carboxylic acid, a heterocyclic carboxylic acid, a hydroxy acid, an amino acid, an amino acid derivative and the like.

Examples of specific saturated aliphatic monocarboxylic acids include acetic acid, propionic acid, butyric acid, valeric acid, heptoic acid, octanoic acid, lauric acid, stearic acid, behenic acid and the like.

Examples of specific saturated aliphatic dicarboxylic acids include oxalic acid, malonic acid, succinic acid, adipic acid, sebacic acid and the like.

Examples of specific unsaturated aliphatic carboxylic acids include acrylic acid, oleic acid, crotonic acid, fumaric acid and the like.

Examples of specific carbon cyclic carboxylic acids include benzoic acid, camphoric acid, phthalic acid, toluic acid, hydroatropic acid, cinnamic acid and the like.

Examples of specific heterocyclic carboxilic acids include furoic acid, thenoic acid, pyrrolidone carboxylic acid, nicotinic acid and the like.

Examples of specific hydroxy acids include lactic acid, malic acid, benzilic acid, salicylic acid, anisic acid, vanillic acid, protocatechuic acid, gallic acid and the like.

Examples of specific amino acids and amino acid derivatives include glutamic acid, lysine, aspartic acid, glycine, N-stearoylglycine, N-acetylglutamic acid, N-lauroylleucine, γ-methylglutamic acid and the like.

As metal salts of organic acids which may be used as the surface treatment agent, metal salts of the above described organic acids may be taken. Examples of specific metals in said metal salts include zinc, calcium, magnesium, potassium, sodium, lithium, aluminum, nickel and the like. In addition, these organic acid metal salts may be mixtures of two or more of them or complex salts.

As polyhydric alcohols which may be used as the surface treatment agent, there may be taken pentaerythritol, dipentaerythritol, tripentaerythritol, polypentaerythritol, sorbitol, glycerin, polyglycerin and the like. Also, partially estrified or etherified products of these polyhydric alcohols are to be included in the category of polyhydric alcohols defined in the present invention.

Also, other surface treatment agents which may be used industrially may be used, if necessary. Examples of other surface treatment agents include silane-, aluminum- and phosphate-coupling agents; anionic, cationic and nonionic surfactants; polymeric dispersing agents and the like.

Although the amount used of the surface treatment agent varies depending on the kind of dolomitic compound, the specific surface area of its powder particles and the amount of water bonded to its surface, the surface treatment agent may be used in an amount of 0.05–40% by weight, preferably 0.1–20% by weight, based on dolomitic compound to be surface-treated. In the case that the amount used of the surface treatment agent is less than 0.05% by weight, almost no surface treatment effect is not achieved while even when surface treatment agent was used in an amount larger than 40% by weight, no further increase is realized in the surface treatment effect due to the surface of powdery dolomitic compound particles being saturated with surface treatment agent.

The method for surface treatment is not particularly limited, and examples of the method include (1) a method in which surface treatment agent is directly added to powdery dolomitic compound and then pulverized together with a grinder such as Henschel mixer, colloid mill, ball mill or the like; and (2) a method in which surface treatment agent and dolomitic compound are added to a suitable solvent such as toluene, xylene, methyl ethyl ketone, acetonitrile, chloroform, diethyl ether, water, ethanol, methanol or the like, mixed under stirring and then the solvent is removed.

The amount added of dolomitic compound for use in the present invention is 0.01–20 parts by weight, preferably 0.1–15.0 parts by weight based on 100 parts of a woody thermoplastic resin (a wood flour-containing thermoplastic resin). In the case that the amount added of dolomitic compound is less than 0.01 part by weight, there is not realized not only effect to prevent the formation of rust during molding processing such as extrusion molding and injection but also effect to suppress the generation of volatile substances. On the other hand, in the case that the amount added of dolomitic compound exceeds 20.0 parts by weight, there can be obtained the same level of effect to suppress the generation of volatile substances as in the case that it is less than 20.0 parts by weight but there can not be obtained not only the expected further effect to prevent the formation of rust by increase in the amount added but also there occurs a problem of lowering in the physical property of the molded articles.

The method for adding a dolomitic compound to the wood flour-containing thermoplastic resin may be conducted by the known method. For example, a dolomitic compound and wood flour-containing thermoplastic resin are mixed together with a grinder such as Henschel mixer, ribbon blender, Banbury mixer or the like, or otherwise one packed compounding of a thermoplastic resin, wood flour and a dolomitic compound in advance is mixed with the above described grinders.

In addition to the above described ingredients, there may be used other additives e.g. a heat deterioration preventing agent, an antioxidant such as a weather-resistant stabilizer including a ultraviolet absorbing agent, a filler, a dispersing agent, a foaming agent, a flame retarder, a plasticizer, an antistatic agent, a reinforcing agent, a processing aid, a pigment and the like.

In carrying out the present invention, the following embodiments are exemplified:

(1) A woody thermoplastic resin composition comprising a woody thermoplastic resin comprising 100 parts by weight of a thermoplastic resin and 5–150 parts by weight of wood flour and 0.01–20.0 parts by weight, based on said woody thermoplastic resin, of a dolomitic compound (2) A woody thermoplastic resin composition comprising a woody thermoplastic resin comprising 100 parts by weight of a thermoplastic resin and 20–100 parts by weight of wood flour and 0.1–15.0 parts by weight, based on said woody thermoplastic resin, of a dolomitic compound (3) A woody thermoplastic resin composition comprising a woody thermoplastic resin comprising 100 parts by weight of a thermoplastic resin and 5–150 parts by weight of wood flour and 0.01–20.0 parts by weight, based on said woody thermoplastic resin, of a natural dolomite and/or a synthetic dolomite composed of magnesium carbonate-calcium carbonate complex salt (4) A woody thermoplastic resin composition comprising a woody thermoplastic resin comprising 100 parts by weight of a thermoplastic resin and 5–150 parts by weight of wood flour and 0.01–20.0 parts by weight, based on said woody thermoplastic resin, of a dolomitic compound composed of complex salt in which the weight ratio of magnesium to calcium is 5:95–95:5 in terms of MgO:CaO (5) A woody thermoplastic resin composition comprising a woody thermoplastic resin comprising 100 parts by weight of a thermoplastic resin and 5–150 parts by weight of wood flour and 0.01–20.0 parts by weight, based on said woody thermoplastic resin, of a light burnt dolomite derived from a dolomitic compound composed of complex salt in which the weight ratio of magnesium to calcium is 5:95–95:5 in terms of MgO:CaO by heating at a temperature of 900–1,000° C.

(6) A woody thermoplastic resin composition comprising a woody thermoplastic resin comprising 100 parts by weight of a thermoplastic resin and 5–150 parts by weight of wood flour and 0.01–20.0 parts by weight, based on said woody thermoplastic resin, of a dolomitic compound subjected to surface treatment with a surface treatment agent (7) A woody thermoplastic resin composition comprising a woody thermoplastic resin comprising 100 parts by weight of a thermoplastic resin and 20–100 parts by weight of wood flour and 0.1–15.0 parts by weight, based on said woody thermoplastic resin, of a natural dolomite and/or a synthetic dolomite composed of a magnesium carbonate-calcium carbonate complex salt (8) A woody thermoplastic resin composition comprising a woody thermoplastic resin comprising 100 parts by weight of a thermoplastic resin and 20–100 parts by weight of wood flour and 0.1–15.0 parts by weight, based on said woody thermoplastic resin, of a dolomitic compound composed of a complex salt in which the weight ratio of magnesium to calcium is 5:95–95:5 in terms of MgO:CaO (9) A woody thermoplastic resin composition comprising a woody thermoplastic resin comprising 100 parts by weight of a thermoplastic resin and 20–100 parts by weight of wood flour and 0.1–15.0 parts by weight, based on said woody thermoplastic resin, of a light burnt dolomite produced by lightly burning a dolomitic compound at a temperature of 900° C.–1,000° C., said dolomitic compound being a complex salt in which the weight ratio of magnesium to calcium is 5:95–95:5 in terms of MgO:CaO

(10) A woody thermoplastic resin composition comprising a woody thermoplastic resin comprising 100 part by weight of a thermoplastic resin and 20–100 parts by weight of wood flour and 0.1–15.0 parts by weight, based on said woody thermoplastic resin, of a dolomitic compound subjected to surface treatment with a surface treatment agent.

The preferred embodiments of the present invention are the above ones (2)–(10), more preferred embodiments being the above ones (4)–(6), (8)–(10), especially preferred embodiments being (5), (6), (9) and (10), the most preferred embodiment being the above one (10).

The following Examples illustrate the present invention specifically but the present invention is not limited thereto. In the Examples, the term "part" means part by weight.

SYNTHESIS EXAMPLE 1

6.9 Parts of magnesium hydroxide and 121.3 parts of calcium hydroxide were added to 2,000 parts of water and then carbon dioxide was bubbled therein at 10° C. for 3 hours under stirring. The formed precipitate was filtered out and dried at 50° C. in an atmosphere of carbon dioxide to obtain 143.6 parts of a magnesium carbonate-calcium carbonate complex salt (synthetic dolomite). The weight ratio of magnesium to calcium in the obtained complex salt was 5:95 in terms of MgO:CaO.

SYNTHESIS EXAMPLE 2

131.9 Parts of magnesium hydroxide and 6.4 parts of calcium hydroxide were added to 2,000 parts of water and then carbon dioxide was bubbled therein at 10° C. for 3 hours under stirring. The formed precipitate was filtered out and dried at 50° C. in an atmosphere of carbon dioxide to obtain 164.6 parts of a magnesium carbonate-calcium carbonate complex salt (synthetic dolomite). The weight ratio of magnesium to calcium in the obtained complex salt was 95:5 in terms of MgO:CaO.

SYNTHESIS EXAMPLE 3

58.3 Parts of magnesium hydroxide and 74.1 parts of calcium hydroxide were added to 2,000 parts of water and then carbon dioxide was bubbled therein at 10° C. for 3 hours under stirring. The formed precipitate was filtered out and dried at 50° C. in an atmosphere of carbon dioxide to obtain 152.3 parts of a magnesium carbonate-calcium carbonate complex salt (synthetic dolomite). The weight ratio of magnesium to calcium in the obtained complex salt was 46:54 in terms of MgO:CaO.

SYNTHESIS EXAMPLE 4

The synthetic dolomite obtained in Synthesis Example 1 was burnt at 1,000° C. for 1 hour to yield light burnt dolomite.

SYNTHESIS EXAMPLE 5

1.9 Kilograms of the light burnt synthetic dolomite obtained in Synthesis Example 4 was pulverized together with 0.1 kg of calcium stearate under a deaerated and dry condition over 24 hours. The median diameter of the obtained light burnt synthetic dolomite subjected to surface treatment with calcium stearate was 1.1 μm.

SYNTHESIS EXAMPLE 6

19.6 Kilograms of unpulverized dolomite (a product of Tagen Lime Industry Co., Ltd.) was pulverized together with 0.4 kg of calcium stearate under deaerated and dry condition over 24 hours. The median diameter of the obtained synthetic dolomite subjected to the surface treatment with calcium stearate was 1.2 μm.

SYNTHESIS EXAMPLE 7

19.6 Kilograms of light burnt dolomite (a product of Tagen Lime Industry Co., Ltd.) was pulverized together with 1.0 kg of calcium stearate under deaerated and dry condition over 24 hours. The median diameter of the obtained light burnt synthetic dolomite subjected to the surface treatment with calcium stearate was 1.1 μm.

Additives for Use in the Present Invention

A-1: Surface untreated and pulverized dolomite (a product of Tagen Lime Industry Co., Ltd.)
A-2: Surface untreated and pulverized light burnt dolomite (a product of Tagen Lime Industry Co., Ltd.)
A-3: Surface untreated and pulverized dolimitic slaked lime (a product of Tagen Lime Industry Co., Ltd.)
A-4: Surface untreated and pulverized dolomite prepared by Synthesis Example 1:
A-5: Surface untreated and pulverized dolomite prepared by Synthesis Example 2
A-6: Surface untreated and pulverized dolomite prepared by Synthesis Example 3
A-7: Surface untreated, pulverized and light burnt dolomite prepared by Synthesis Example 4
A-8: Surface treated, pulverized and light burnt dolomite prepared by Synthesis Example 5
A-9: Surface treated and pulverized dolomite prepared by Synthesis Example 6
A-10: Surface treated, pulverized and light burnt dolomite prepared by Synthesis Example 7

Control Additives

B-1: Magnesium oxide
B-2: Calcium oxide
B-3: Magnesium carbonate
B-4: Calcium carbonate
B-5: Magnesium hydroxide
B-6: Calcium hydroxide
B-7: Magnesium stearate
B-8: Calcium stearate
B-9: Calcium 12-hydroxystearate
B-10: Synthetic hydrotalcite (a trade name "DHT-4A", a product of Kyowa Chemical Industry Co., Ltd.)
B-11: Synthetic hydrotalcite (a trade name "Alcamizer", a product of Kyowa Chemical Industry Co., Ltd.)
B-12: Synthetic hydrotalcite (a trade name "Toyobuilder", a product of Tosoh Corporation)
B-13: Fibrous magnesium hydroxysulphate (a trade name "Mosheiji", a product of Ube Industries, Ltd.)
B-14: hindered amine stabilizer (a trade name "Sanol LS-770", a product of Sankyo Company, Limited)

EXAMPLE 1

100 Parts of polyvinyl chloride (a trade name "ZEST 1,000Z", a product of Shin Dai-ichi Vinyl Corporation), 20 parts of wood flour (a product of Kaneki Fuel Co., Ltd.), and an additive shown in tables 1–4 were mixed sufficiently and the resultant composition was kneaded for 3 minutes by a 8-inch test roll mill heated to 160° C. and then rolled into a sheet having a thickness of 0.5 mm.

Rusting Test

The obtained sheet having a thickness of 0.5 mm was cut into pellets, each having 3 mm square. 5 Grams of the pellets and a nail were placed in a test tube and the test tube was placed in a heating block set to 190° C., and then the occurring state of rust on the nail after 30 minutes was visually evaluated.

The occurrence state of rust on the nail was evaluated according to the following criterion.
⊚: No occurrence of rust on the nail
○: Slight occurrence of rust on the nail
Δ: Occurrence of rust on about 50% or less of the surface of the nail
X: Occurrence of rust on about 50% or more of the surface of the nail
XX: Occurrence of rust on the whole surface of the nail

Volatility Test

The obtained sheet having a thickness of 0.5 mm was cut into small size of sheets each having 70 mm square. Said sheet was packed with an aluminum foil and then placed in a Geer's aging tester maintained to 190° C., and the foaming state of the sheet after 30 minutes was visually evaluated.

The foaming state of the sheet was evaluated according to the following criterion.
⊚: No foaming on the surface of the sheet
○: Slight foaming on the surface of the sheet
Δ: Foaming on about 50% or less of the surface of the sheet
X: Foaming on about 50% or more of the surface of the sheet
XX: Foaming on the whole surface of the sheet

TABLE 1

| Sample No. | Additive | Amount Added (Part) | Rusting Test | Volatility Test |
|---|---|---|---|---|
| 1 | A-1 | 0.1 | ○ | ○ |
| 2 | A-2 | 0.1 | ⊚ | ⊚ |
| 3 | A-3 | 0.1 | ○ | Δ |
| 4 | A-4 | 0.1 | ○ | ○ |
| 5 | A-5 | 0.1 | ○ | ○ |
| 6 | A-6 | 0.1 | ○ | ○ |
| 7 | A-7 | 0.1 | ⊚ | ⊚ |
| 8 | A-8 | 0.1 | ⊚ | ⊚ |
| 9 | A-9 | 0.1 | ⊚ | ⊚ |
| 10 | A-10 | 0.1 | ⊚ | ⊚ |
| 11 | A-1 | 5.0 | ⊚ | ○ |
| 12 | A-2 | 5.0 | ⊚ | ⊚ |
| 13 | A-3 | 5.0 | ⊚ | ○ |
| 14 | A-4 | 5.0 | ○ | ○ |
| 15 | A-5 | 5.0 | ○ | ○ |
| 16 | A-6 | 5.0 | ⊚ | ○ |
| 17 | A-7 | 5.0 | ⊚ | ⊚ |
| 18 | A-8 | 5.0 | ⊚ | ⊚ |
| 19 | A-9 | 5.0 | ⊚ | ⊚ |
| 20 | A-10 | 5.0 | ⊚ | ⊚ |
| 21 | A-1 | 15.0 | ⊚ | ○ |
| 22 | A-2 | 15.0 | ⊚ | ⊚ |
| 23 | A-3 | 15.0 | ⊚ | ○ |
| 24 | A-4 | 15.0 | ○ | ○ |
| 25 | A-5 | 15.0 | ○ | ○ |
| 26 | A-6 | 15.0 | ⊚ | ○ |
| 27 | A-7 | 15.0 | ⊚ | ⊚ |

TABLE 2

| Sample No. | Additive | Amount Added (Part) | Rusting Test | Volatility Test |
|---|---|---|---|---|
| 28 | A-8 | 15.0 | ⊚ | ⊚ |
| 29 | A-9 | 15.0 | ⊚ | ⊚ |
| 30 | A-10 | 15.0 | ⊚ | ⊚ |
| 31 | A-2 | 20.0 | ⊚ | ⊚ |
| 32 | A-7 | 20.0 | ⊚ | ⊚ |
| 33 | A-2 | 25.0 | Δ | ⊚ |
| 34 | A-7 | 25.0 | Δ | ⊚ |
| 35 | A-2 | 0.005 | XX | XX |
| 36 | A-7 | 0.005 | XX | XX |
| 37 | B-1 | 0.1 | X | X |
| 38 | B-2 | 0.1 | X | X |
| 39 | B-3 | 0.1 | X | XX |
| 40 | B-4 | 0.1 | X | XX |
| 41 | B-5 | 0.1 | X | X |
| 42 | B-6 | 0.1 | X | X |
| 43 | B-7 | 0.1 | XX | XX |
| 44 | B-8 | 0.1 | XX | XX |
| 45 | B-9 | 0.1 | XX | XX |
| 46 | B-10 | 0.1 | X | X |
| 47 | B-11 | 0.1 | X | X |
| 48 | B-12 | 0.1 | X | X |
| 49 | B-13 | 0.1 | XX | XX |
| 50 | B-14 | 0.1 | XX | XX |
| 51 | B-1 | 5.0 | X | X |
| 52 | B-2 | 5.0 | X | X |
| 53 | B-3 | 5.0 | X | XX |
| 54 | B-4 | 5.0 | X | XX |

TABLE 3

| Sample No. | Additive | Amount Added (Part) | Rusting Test | Volatility Test |
|---|---|---|---|---|
| 55 | B-5 | 5.0 | X | X |
| 56 | B-6 | 5.0 | X | X |
| 57 | B-7 | 5.0 | XX | XX |
| 58 | B-8 | 5.0 | XX | XX |
| 59 | B-9 | 5.0 | XX | XX |
| 60 | B-10 | 5.0 | X | XX |
| 61 | B-11 | 5.0 | X | XX |
| 62 | B-12 | 5.0 | X | XX |
| 63 | B-13 | 5.0 | XX | XX |
| 64 | B-14 | 5.0 | XX | XX |
| 65 | B-1 | 15.0 | X | X |
| 66 | B-2 | 15.0 | X | X |
| 67 | B-3 | 15.0 | X | XX |
| 68 | B-4 | 15.0 | X | XX |
| 69 | B-5 | 15.0 | X | X |
| 70 | B-6 | 15.0 | X | X |
| 71 | B-7 | 15.0 | XX | XX |
| 72 | B-8 | 15.0 | XX | XX |
| 73 | B-9 | 15.0 | XX | XX |
| 74 | B-10 | 15.0 | Δ | XX |
| 75 | B-11 | 15.0 | Δ | XX |
| 76 | B-12 | 15.0 | X | XX |
| 77 | B-13 | 15.0 | XX | XX |
| 78 | B-14 | 15.0 | XX | XX |
| 79 | B-1 | 0.05 | X | X |
|  | B-2 | 0.05 |  |  |
| 80 | B-3 | 0.05 | X | XX |
|  | B-4 | 0.05 |  |  |

TABLE 4

| Sample No. | Additive | Amount Added (Part) | Rusting Test | Volatility Test |
|---|---|---|---|---|
| 81 | B-5 | 0.05 | X | X |
|  | B-6 | 0.05 |  |  |
| 82 | B-1 | 2.5 | X | X |
|  | B-2 | 2.5 |  |  |
| 83 | B-3 | 2.5 | X | XX |
|  | B-4 | 2.5 |  |  |
| 84 | B-5 | 2.5 | X | X |
|  | B-6 | 2.5 |  |  |
| 85 | B-1 | 7.5 | X | X |
|  | B-2 | 7.5 |  |  |
| 86 | B-3 | 7.5 | X | XX |
|  | B-4 | 7.5 |  |  |
| 87 | B-5 | 7.5 | X | X |
|  | B-6 | 7.5 |  |  |
| 88 | No Addition |  | XX | XX |

Sample Nos. 1–32 are Examples involving in the present invention while Sample Nos. 33–88 are Comparative Examples. The comparison among the results shown in tables 1–4 revealed that the woody thermoplastic resin composition of the present invention has not only superior effect to prevent the occurrence of rust on the metal surface to the control composition but also superior effect to suppress to the generation of the volatile substances to the control composition. In spite of the additives involving in the present invention like Sample Nos. 33 and 34, each sample was used in an amount exceeding the upper limitation of 20.0 parts based on the total amount of the woody thermoplastic resin, sufficient rust-preventive effect toward the metal can not be achieved. Also, in spite of the additives involving in the present invention like Sample Nos. 35 and 36, each sample was used in an amount smaller than the lower limitation of 0.01 part based on the total amount of the woody thermoplastic resin. Were used other additives not to involve in the present invention like Sample Nos. 37–87; a magnesium compound and a calcium compound were used together without forming their complex salt like Sample Nos. 79–87; no additive was used like Sample No. 88. In every case, there cannot be achieved sufficient rust-preventive effect toward the metal and volatile substance-reducing effect.

EXAMPLE 2

100 Parts of polystyrene (a trade name "STYRON685D", a product of Dow Chemical Company), 20 parts of wood flour (a product of Kaneki Fuel Co., Ltd.), 0.3 part of polystyrene wax (a trade name "HI-WAX 400PF", a product of Mitsui Chemicals Inc.) and a prescribed amount of an additive shown in tables 5 and 6 were sufficiently mixed together and the resultant mixture was kneaded for 3 minutes by a 8-inch test roll mill heated to 150° C. and then rolled into a sheet having a thickness of 0.5 mm.

Rusting Test

The obtained sheet having a thickness of 0.5 mm was cut into pellets, each having 3 mm square. 5 Grams of the pellets and a nail were placed in a test tube and the test tube was placed in a heating block set to 200° C., and then the occurrence state of rust on the nail after 30 minutes was visually evaluated.

The occurrence state of rust on the nail was evaluated according to the similar criterion as in Example 1.

Volatility Test

The obtained sheet having a thickness of 0.5 mm was cut into small size of sheets, each having 70 mm square. Said sheet was packed with an aluminum foil and then placed in a Geer's aging tester maintained to 200° C., and the foaming state of the sheet after 30 minutes was visually evaluated.

The foaming state of the sheet was evaluated according to the similar criterion as in Example 1.

TABLE 5

| Sample No. | Additive | Amount Added (Part) | Rusting Test | Volatility Test |
|---|---|---|---|---|
| 1 | A-1 | 0.1 | ○ | ○ |
| 2 | A-2 | 0.1 | ⊙ | ⊙ |
| 3 | A-7 | 0.1 | ⊙ | ⊙ |
| 4 | A-10 | 0.1 | ⊙ | ⊙ |
| 5 | A-1 | 5.0 | ⊙ | ○ |
| 6 | A-2 | 5.0 | ⊙ | ⊙ |
| 7 | A-7 | 5.0 | ⊙ | ⊙ |
| 8 | A-10 | 5.0 | ⊙ | ⊙ |
| 9 | A-1 | 15.0 | ⊙ | ○ |
| 10 | A-2 | 15.0 | ⊙ | ⊙ |
| 11 | A-7 | 15.0 | ⊙ | ⊙ |
| 12 | A-10 | 15.0 | ⊙ | ⊙ |
| 13 | A-2 | 25.0 | Δ | ⊙ |
| 14 | A-7 | 25.0 | Δ | ⊙ |
| 15 | B-3 | 0.1 | X | XX |
| 16 | B-4 | 0.1 | X | XX |
| 17 | B-10 | 0.1 | X | X |
| 18 | B-3 | 5.0 | X | XX |
| 19 | B-4 | 5.0 | X | XX |
| 20 | B-10 | 5.0 | X | XX |

TABLE 6

| Sample No. | Additive | Amount Added (Part) | Rusting Test | Volatility Test |
|---|---|---|---|---|
| 21 | B-3 | 15.0 | X | XX |
| 22 | B-4 | 15.0 | X | XX |
| 23 | B-10 | 15.0 | Δ | XX |
| 24 | B-3 | 0.05 | X | XX |
|  | B-4 | 0.05 |  |  |
| 25 | B-3 | 2.5 | X | XX |
|  | B-4 | 2.5 |  |  |
| 26 | B-3 | 7.5 | X | XX |
|  | 8-4 | 7.5 |  |  |
| 27 | No Addition |  | XX | XX |

Sample Nos. 1–12 are Examples involving in the present invention while sample Nos. 13–27 are Comparative Examples. It can be seen from the results shown in tables 5 and 6 that the woody thermoplastic resin composition of the present invention has not only superior effect to prevent the occurrence of rust on the metal surface to the control composition but also superior effect to suppress the generation of the volatile substances to the control composition. In spite of the additives involving in the present invention like Sample Nos. 13 and 14, each sample was used in an amount exceeding the upper limitation of 20.0 parts based on the total amount of the woody thermoplastic resin, sufficient rust-preventive effect toward the metal can not be achieved. Also, were used other additives not to involve in the present invention like Sample Nos. 15–23; a magnesium compound and a calcium compound were used together without forming their complex salt like Sample Nos. 24–26; and no additive was used like Sample No. 27. In every case, there cannot be achieved sufficient rust-preventive effect toward the metal and volatile substance-reducing effect.

EXAMPLE 3

100 Parts of polypropylene (a trade name "SK-711", a product of Showa Denko K.K.), 20 parts of wood flour (a product of Kaneki Fuel Co., Ltd.), 2 parts of barium stearate and a prescribed amount of an additive shown in tables 7 and 8 were sufficiently mixed together and the resultant mixture was kneaded for 3 minutes by a 8-inch test roll mill heated to 180° C. and then rolled into a sheet having a thickness of 0.5 mm.

Rusting Test

The obtained sheet having a thickness of 0.5 mm was cut into pellets, each having 3 mm square. 5 Grams of the pellets and a nail were placed in a test tube and the test tube was placed in a heating block set to 200° C., and then the occurrence state of rust on the nail after 30 minutes was visually evaluated.

The occurrence state of rust on the nail was evaluated according to the similar criterion as in Example 1.

Volatility Test

The obtained sheet having a thickness of 0.5 mm was cut into small size of sheets, each having 70 mm square. Said sheet was packed with an aluminum foil and then placed in a Geer's aging tester maintained to 200° C., and the foaming state of the sheet after 20 minutes was visually evaluated.

The foaming state of the sheet was evaluated according to the similar criterion as in Example 1.

TABLE 7

| Sample No. | Additive | Amount Added (Part) | Rusting Test | Volatility Test |
|---|---|---|---|---|
| 1 | A-1 | 0.1 | ○ | ○ |
| 2 | A-2 | 0.1 | ◎ | ◎ |
| 3 | A-7 | 0.1 | ◎ | ◎ |
| 4 | A-10 | 0.1 | ◎ | ◎ |
| 5 | A-1 | 5.0 | ◎ | ○ |
| 6 | A-2 | 5.0 | ◎ | ◎ |
| 7 | A-7 | 5.0 | ◎ | ◎ |
| 8 | A-10 | 5.0 | ◎ | ◎ |
| 9 | A-1 | 15.0 | ◎ | ○ |
| 10 | A-2 | 15.0 | ◎ | ◎ |
| 11 | A-7 | 15.0 | ◎ | ◎ |
| 12 | A-10 | 15.0 | ◎ | ◎ |
| 13 | A-2 | 25.0 | △ | ◎ |
| 14 | A-7 | 25.0 | △ | ◎ |
| 15 | B-3 | 0.1 | X | XX |
| 16 | B-4 | 0.1 | X | XX |
| 17 | B-10 | 0.1 | X | X |
| 18 | B-3 | 5.0 | X | XX |
| 19 | B-4 | 5.0 | X | XX |
| 20 | B-10 | 5.0 | X | XX |

TABLE 8

| Sample No. | Additive | Amount Added (Part) | Rusting Test | Volatility Test |
|---|---|---|---|---|
| 21 | B-3 | 15.0 | X | XX |
| 22 | B-4 | 15.0 | X | XX |
| 23 | B-10 | 15.0 | △ | XX |
| 24 | B-3 | 0.05 | X | XX |
|    | B-4 | 0.05 |   |   |
| 25 | B-3 | 2.5 | X | XX |
|    | B-4 | 2.5 |   |   |
| 26 | B-3 | 7.5 | X | XX |
|    | B-4 | 7.5 |   |   |
| 27 | No Addition |   | XX | XX |

Sample Nos. 1–10 are Examples involving in the present invention while sample Nos. 11–28 are Comparative Examples. It can be seen from the results shown in tables 7 and 8 that the woody thermoplastic resin composition of the present invention has not only superior effect to prevent the occurrence of rust on the metal surface to the control composition but also superior effect to suppress the generation of the volatile substances to the control composition. In spite of the additives involving in the present invention like sample Nos. 13 and 14, each sample was used in an amount exceeding the upper limitation of 20.0 parts based on the total amount of the woody thermoplastic resin, sufficient rust-preventive effect toward the metal can not be achieved. Also, were used other additives not to involve in the present invention like Sample Nos. 15–23; a magnesium compound and a calcium compound were used together without forming their complex salt like sample Nos. 24–26; and no additive was used like sample No. 27. In every case, there cannot be achieved sufficient rust-preventive effect toward the metal and volatile substance-reducing effect.

EXAMPLE 4

100 Parts of polyvinyl chloride (a trade name "ZEST 1,000Z", a product of Shin Dai-ichi Vinyl Corporation), 100 parts of wood flour (a product of Kaneki Fuel Co., Ltd.), and a certain amount of an additive shown in tables 9 and 10 were mixed sufficiently and the resultant composition was kneaded for 3 minutes by a 8-inch test roll mill heated to 160° C. and then rolled into a sheet having a thickness of 0.5 mm.

Rusting Test

The obtained sheet having a thickness of 0.5 mm was cut into pellets, each having 3 mm square. 5 Grams of the pellets and a nail were placed in a test tube and the test tube was placed in a heating block set to 190° C., and then the occurring state of rust on the nail after 30 minutes was visually evaluated.

The occurrence state of rust on the nail was evaluated according to the similar criterion as in Example 1.

Volatility Test

The obtained sheet having a thickness of 0.5 mm was cut into small size of sheets, each having 70 mm square. Said sheet was packed with an aluminum foil and then placed in a Geer's aging tester maintained to 200° C., and the foaming state of the sheet after 20 minutes was visually evaluated.

The foaming state of the sheet was evaluated according to the similar criterion as in Example 1.

TABLE 9

| Sample No. | Additive | Amount Added (Part) | Rusting Test | Volatility Test |
|---|---|---|---|---|
| 1 | A-1 | 0.1 | ○ | ○ |
| 2 | A-2 | 0.1 | ◎ | ◎ |
| 3 | A-7 | 0.1 | ◎ | ◎ |
| 4 | A-10 | 0.1 | ◎ | ◎ |
| 5 | A-1 | 5.0 | ◎ | ○ |
| 6 | A-2 | 5.0 | ◎ | ◎ |
| 7 | A-7 | 5.0 | ◎ | ◎ |
| 8 | A-10 | 5.0 | ◎ | ◎ |
| 9 | A-1 | 15.0 | ◎ | ○ |
| 10 | A-2 | 15.0 | ◎ | ◎ |
| 11 | A-7 | 15.0 | ◎ | ◎ |
| 12 | A-10 | 15.0 | ◎ | ◎ |
| 13 | A-2 | 25.0 | △ | ◎ |
| 14 | A-7 | 25.0 | △ | ◎ |
| 15 | B-3 | 0.1 | XX | XX |
| 16 | B-4 | 0.1 | XX | XX |
| 17 | B-10 | 0.1 | XX | XX |

TABLE 9-continued

| Sample No. | Additive | Amount Added (Part) | Rusting Test | Volatility Test |
|---|---|---|---|---|
| 18 | B-3 | 5.0 | XX | XX |
| 19 | B-4 | 5.0 | XX | XX |
| 20 | B-10 | 5.0 | X | XX |

TABLE 10

| Sample No. | Additive | Amount Added (Part) | Rusting Test | Volatility Test |
|---|---|---|---|---|
| 21 | B-3 | 15.0 | X | XX |
| 22 | B-4 | 15.0 | X | XX |
| 23 | B-10 | 15.0 | X | XX |
| 24 | B-3 | 0.05 | XX | XX |
|  | B-4 | 0.05 |  |  |
| 25 | B-3 | 2.5 | XX | XX |
|  | B-4 | 2.5 |  |  |
| 26 | B-3 | 7.5 | X | XX |
|  | B-4 | 7.5 |  |  |
| 27 | No Addition |  | XX | XX |

Sample Nos. 1–12 are Examples involving in the present invention while sample Nos. 13–27 are Comparative Examples. It can be seen from the results shown in tables 9 and 10 that the woody thermoplastic resin composition of the present invention has not only superior effect to prevent the occurrence of rust on the metal surface to the control composition but also superior effect to suppress the generation of the volatile substances to the control composition. In spite of the additives involving in the present invention like Sample Nos. 13 and 14, each sample was used in an amount exceeding the upper limitation of 20.0 parts based on the total amount of the woody thermoplastic resin, sufficient rust-preventive effect toward the metal can not be achieved. Also, were used other additives not to involve in the present invention like Sample Nos. 15–23; a magnesium compound and a calcium compound were used together without forming their complex salt like Sample Nos. 24–26; and no additive was used like Sample No. 27. In every case, there cannot be achieved sufficient rust-preventive effect toward the metal and volatile substance-reducing effect.

EXAMPLE 5

100 Parts of polystyrene (a trade name "STYRON685D", a product of Dow Chemical Company), 100 parts of wood flour (a product of Kaneki Fuel Co., Ltd.), 0.3 part of polystyrene wax (a trade name "HI-WAX 400PF", a product of Mitsui Chemicals Inc.) and a prescribed amount of an additive shown in tables 11 and 12 were sufficiently mixed together and the resultant mixture was kneaded for 3 minutes by a 8-inch test roll mill heated to 150° C. and then rolled into a sheet having a thickness of 0.5 mm.

Rusting Test

The obtained sheet having a thickness of 0.5 mm was cut into pellets, each having 3 mm square. 5 Grams of the pellets and a nail were placed in a test tube and the test tube was placed in a heating block set to 200° C., and then the occurrence state of rust on the nail after 30 minutes was visually evaluated.

The occurrence state of rust on the nail was evaluated according to the similar criterion as in Example 1.

Volatility Test

The obtained sheet having a thickness of 0.5 mm was cut into small size of sheets, each having 70 mm square. Said sheet was packed with an aluminum foil and then placed in a Geer's aging tester maintained to 200° C., and the foaming state of the sheet after 30 minutes was visually evaluated.

The foaming state of the sheet was evaluated according to the similar criterion as in Example 1.

TABLE 11

| Sample No. | Additive | Amount Added (Part) | Rusting Test | Volatility Test |
|---|---|---|---|---|
| 1 | A-1 | 0.1 | ○ | ○ |
| 2 | A-2 | 0.1 | ⊙ | ⊙ |
| 3 | A-7 | 0.1 | ⊙ | ⊙ |
| 4 | A-10 | 0.1 | ⊙ | ⊙ |
| 5 | A-1 | 5.0 | ⊙ | ○ |
| 6 | A-2 | 5.0 | ⊙ | ⊙ |
| 7 | A-7 | 5.0 | ⊙ | ⊙ |
| 8 | A-10 | 5.0 | ⊙ | ⊙ |
| 9 | A-1 | 15.0 | ⊙ | ○ |
| 10 | A-2 | 15.0 | ⊙ | ⊙ |
| 11 | A-7 | 15.0 | ⊙ | ⊙ |
| 12 | A-10 | 15.0 | ⊙ | ⊙ |
| 13 | A-2 | 25.0 | Δ | ⊙ |
| 14 | A-7 | 25.0 | Δ | ⊙ |
| 15 | B-3 | 0.1 | XX | XX |
| 16 | B-4 | 0.1 | XX | XX |
| 17 | B-10 | 0.1 | XX | XX |
| 18 | B-3 | 5.0 | XX | XX |
| 19 | B-4 | 5.0 | XX | XX |
| 20 | B-10 | 5.0 | X | xx |

TABLE 12

| Sample No. | Additive | Amount Added (Part) | Rusting Test | Volatility Test |
|---|---|---|---|---|
| 21 | B-3 | 15.0 | X | XX |
| 22 | B-4 | 15.0 | X | XX |
| 23 | B-10 | 15.0 | Δ | XX |
| 24 | B-3 | 0.05 | XX | XX |
|  | B-4 | 0.05 |  |  |
| 25 | B-3 | 2.5 | XX | XX |
|  | B-4 | 2.5 |  |  |
| 26 | B-3 | 7.5 | X | XX |
|  | B-4 | 7.5 |  |  |
| 27 | No Addition |  | XX | xx |

Sample Nos. 1–12 are Examples involving in the present invention while sample Nos. 13–27 are Comparative Examples. It can be seen from the results shown in tables 11 and 12 that the woody thermoplastic resin composition of the present invention has not only superior effect to prevent the occurrence of rust on the metal surface to the control composition but also superior effect to suppress the generation of the volatile substances to the control composition. In spite of the additives involving in the present invention like Sample Nos. 13 and 14, each sample was used in an amount exceeding the upper limitation of 20.0 parts based on the total amount of the woody thermoplastic resin, sufficient rust-preventive effect toward the metal can not be achieved. Also, were used other additives not to involve in the present invention like Sample Nos. 15–23; a magnesium compound and a calcium compound were used together without forming their complex salt like Sample Nos. 24–26; and no additive was used like Sample No. 27. In every case, there cannot be achieved sufficient rust-preventive effect toward the metal and volatile substance-reducing effect.

EXAMPLE 6

100 Parts of polypropylene (a trade name "SK-711", a product of Showa Denko K.K.), 100 parts of wood flour (a product of Kaneki Fuel Co., Ltd.), 2 parts of barium stearate and a prescribed amount of an additive shown in tables 13 and 14 were sufficiently mixed together and the resultant mixture was kneaded for 3 minutes by a 8-inch test roll mill heated to 180° C. and then rolled into a sheet having a thickness of 0.5 mm.

Rusting Test

The obtained sheet having a thickness of 0.5 mm was cut into pellets, each having 3 mm square. 5 Grams of the pellets and a nail were placed in a test tube and the test tube was placed in a heating block set to 200° C., and then the occurrence state of rust on the nail after 30 minutes was visually evaluated.

The occurrence state of rust on the nail was evaluated according to the similar criterion as in Example 1.

Volatility Test

The obtained sheet having a thickness of 0.5 mm was cut into small size of sheets, each having 70 mm square. Said sheet was packed with an aluminum foil and then placed in a Geer's aging tester maintained to 200° C., and the foaming state of the sheet after 20 minutes was visually evaluated.

The foaming state of the sheet was evaluated according to the similar criterion as in Example 1.

TABLE 13

| Sample No. | Additive | Amount Added (Part) | Rusting Test | Volatility Test |
|---|---|---|---|---|
| 1 | A-1 | 0.1 | ○ | ○ |
| 2 | A-2 | 0.1 | ⊙ | ⊙ |
| 3 | A-7 | 0.1 | ⊙ | ⊙ |
| 4 | A-10 | 0.1 | ⊙ | ⊙ |
| 5 | A-1 | 5.0 | ⊙ | ○ |
| 6 | A-2 | 5.0 | ⊙ | ⊙ |
| 7 | A-7 | 5.0 | ⊙ | ⊙ |
| 8 | A-10 | 5.0 | ⊙ | ⊙ |
| 9 | A-1 | 15.0 | ⊙ | ○ |
| 10 | A-2 | 15.0 | ⊙ | ⊙ |
| 11 | A-7 | 15.0 | ⊙ | ⊙ |
| 12 | A-10 | 15.0 | ⊙ | ⊙ |
| 13 | A-2 | 25.0 | Δ | ⊙ |
| 14 | A-7 | 25.0 | Δ | ⊙ |
| 15 | B-3 | 0.1 | XX | XX |
| 16 | B-4 | 0.1 | XX | XX |
| 17 | B-10 | 0.1 | XX | XX |
| 18 | B-3 | 5.0 | XX | XX |
| 19 | B-4 | 5.0 | XX | XX |
| 20 | B-10 | 5.0 | X | xx |

TABLE 14

| Sample No. | Additive | Amount Added (Part) | Rusting Test | Volatility Test |
|---|---|---|---|---|
| 21 | B-3 | 15.0 | X | XX |
| 22 | B-4 | 15.0 | X | XX |
| 23 | B-10 | 15.0 | X | XX |
| 24 | B-3 | 0.05 | XX | XX |
|  | B-4 | 0.05 |  |  |
| 25 | B-3 | 2.5 | XX | XX |
|  | B-4 | 2.5 |  |  |
| 26 | B-3 | 7.5 | X | XX |
|  | B-4 | 7.5 |  |  |
| 27 | No Addition |  | XX | xx |

Sample Nos. 1–12 are Examples involving in the present invention while sample Nos. 13–27 are Comparative Examples. It can be seen from the results shown in tables 13 and 14 that the woody thermoplastic resin composition of the present invention has not only superior effect to prevent the occurrence of rust on the metal surface to the control composition but also superior effect to suppress the generation of the volatile substances to the control composition. In spite of the additives involving in the present invention like Sample Nos. 13 and 14, when each sample was used in an amount exceeding the upper limitation of 20.0 parts based on the total amount of the woody thermoplastic resin, sufficient rust-preventive effect toward the metal can not be achieved. Also, were used other additives not to involve in the present invention like Sample Nos. 15–23; a magnesium compound and a calcium compound were used together without forming their complex salt like Sample Nos. 24–26; and no additive was used like Sample No. 27. In every case, there cannot be achieved sufficient rust-preventive effect toward the metal and volatile substance-reducing effect.

EXAMPLE 7

100 Parts of polyvinyl chloride (a trade name "ZEST 1,000Z", a product of Shin Dai-ichi Vinyl Corporation), 20 parts of wood flour (a product of Kaneki Fuel Co., Ltd.), and an additive shown in tables 1–4 were mixed sufficiently and the resultant composition was kneaded for 3 minutes by a 8-inch test roll mill heated to 160° C. and then rolled into a sheet having a thickness of 0.5 mm.

Rusting Test

The obtained sheet having a thickness of 0.5 mm was cut into pellets, each having 3 mm square. 5 Grams of the pellets and a nail were placed in a test tube and the test tube was placed in a heating block set to 180° C., and then the occurrence state of rust on the nail after 15 minutes was visually evaluated.

The occurrence state of rust on the nail was evaluated according to the similar criterion as in Example 1.

Volatility Test

The obtained sheet having a thickness of 0.5 mm was cut into small size of sheets, each having 70 mm square. Said sheet was packed with an aluminum foil and then placed in a Geer's aging tester maintained to 190° C., and the foaming state of the sheet after 10 minutes was visually evaluated.

The foaming state of the sheet was evaluated according to the similar criterion as in Example 1.

TABLE 15

| Sample No. | Additive | Amount Added (Part) | Rusting Test | Volatility Test |
|---|---|---|---|---|
| 1 | A-1 | 0.01 | ○ | ○ |
| 2 | A-2 | 0.01 | ⊙ | ⊙ |
| 3 | A-3 | 0.01 | ○ | Δ |
| 4 | A-4 | 0.01 | ○ | Δ |
| 5 | A-5 | 0.01 | ○ | ○ |
| 6 | A-6 | 0.01 | ○ | ○ |
| 7 | A-7 | 0.01 | ⊙ | ⊙ |
| 8 | A-8 | 0.01 | ⊙ | ⊙ |
| 9 | A-9 | 0.01 | ○ | ⊙ |
| 10 | A-10 | 0.01 | ⊙ | ⊙ |
| 11 | A-2 | 0.005 | X | X |
| 12 | A-7 | 0.005 | X | X |
| 13 | B-1 | 0.01 | XX | XX |
| 14 | B-2 | 0.01 | XX | XX |
| 15 | B-3 | 0.01 | XX | XX |
| 16 | B-4 | 0.01 | XX | XX |
| 17 | B-5 | 0.01 | XX | XX |
| 18 | B-6 | 0.01 | XX | XX |

TABLE 15-continued

| Sample No. | Additive | Amount Added (Part) | Rusting Test | Volatility Test |
|---|---|---|---|---|
| 19 | B-7 | 0.01 | XX | XX |
| 20 | B-8 | 0.01 | XX | xx |

TABLE 16

| Sample No. | Additive | Amount Added (Part) | Rusting Test | Volatility Test |
|---|---|---|---|---|
| 21 | B-9 | 0.01 | XX | XX |
| 22 | B-10 | 0.01 | XX | X |
| 23 | B-11 | 0.01 | XX | X |
| 24 | B-12 | 0.01 | XX | XX |
| 25 | B-13 | 0.01 | XX | XX |
| 26 | B-14 | 0.01 | XX | XX |
| 27 | B-3 | 0.005 | XX | XX |
|  | B-4 | 0.005 |  |  |
| 28 | No Addition |  | XX | xx |

Sample Nos. 1–10 are Examples involving in the present invention while sample Nos. 11–28 are Comparative Examples. It can be seen from the results shown in tables 15 and 16 that the woody thermoplastic resin composition of the present invention has not only superior effect to prevent the occurrence of rust on the metal surface to the control composition but also superior effect to suppress the generation of the volatile substances to the control composition. In spite of the additives involving in the present invention like Sample Nos. 11 and 12, each sample was used in an amount smaller than the lower limitation of 0.01 part based on the total amount of the woody thermoplastic resin; were used other additives not to involve in the present invention like sample Nos. 13–26; a magnesium compound and a calcium compound were used together without constituting their complex salt like Sample No. 27; and no additive was used like Sample No. 28. In every case, there cannot be achieved sufficient rust-preventive effect toward the metal and volatile substance-reducing effect.

Effect of the invention

A woody thermoplastic resin composition of the present invention is significantly excellent in effect to prevent the occurrence of rust on the metal surface and to suppress the generation of the volatile substances in comparison with the prior arts.

This application claims priority to Japanese Patent Application 251253/2000 which was filed on Aug. 22, 2000, and which is incorporated herein by reference in its entirety.

What is claimed is:

1. A woody thermoplastic resin composition comprising (A) 100 parts by weight of a thermoplastic resin, (B) 5 to 150 parts by weight of wood flour and 0.01–20.0 parts by weight based on the total amount of (A) and (B) components, of a dolomite, wherein said dolomite is selected from the group consisting of:
(A) light burned dolomites prepared by heating at a temperature of 900 to 1,000° C. a magnesium carbonate-calcium carbonate complex salt in which the weight ratio of magnesium to calcium is 5:95 to 95:5 in terms of MgO:CaO; and
(B) dolomites subjected to surface treatment with a surface treatment agent selected from the group consisting of organic acids, metal salts of an organic acid, polyhydric alcohols, silane coupling agents, aluminum coupling agents, phosphate coupling agents, anionic surfactants, cationic surfactants, nonionic surfactants, polymeric dispersing agents, and mixtures thereof.

2. The woody thermoplastic resin composition claimed as in claim 1 wherein said dolomite is natural dolomite and/or a synthetic dolomite composed of magnesium carbonate-calcium carbonate complex salt.

3. The woody thermoplastic resin composition claimed as in claim 1 wherein said dolomite is a magnesium carbonate-calcium carbonate complex salt in which the weight ratio of magnesium to calcium is 5:95 to 95:5 in terms of MgO:CaO.

4. The woody thermoplastic resin composition claimed as in claim 1 wherein said dolomite is a light burned dolomite prepared by heating at a temperature of 900 to 1,000° C. a magnesium carbonate-calcium carbonate complex salt in which the weight ratio of magnesium to calcium is 5:95 to 95:5 in terms of MgO:CaO.

5. The woody thermoplastic resin composition claimed as in claim 1 wherein said dolomite is one subjected to surface treatment with a surface treatment agent selected from the group consisting of organic acids, metal salts of an organic acid, polyhydric alcohols, silane coupling agents, aluminum coupling agents, phosphate coupling agents, anionic surfactants, cationic surfactants, nonionic surfactants, polymeric dispersing agents, and mixtures thereof.

6. The woody thermoplastic resin composition claimed as in claim 2, wherein said dolomite is a magnesium carbonate-calcium carbonate complex salt in which the weight ratio of magnesium to calcium is 5:95 to 95:5 in terms of MgO:CaO.

7. The woody thermoplastic resin composition claimed as in claim 2, wherein said dolomite is a light burned dolomite prepared by heating at a temperature of 900–1,000° C. a magnesium carbonate-calcium carbonate complex salt in which the weight ratio of magnesium to calcium is 5:95 to 95:5 in terms of MgO:CaO.

8. The woody thermoplastic resin composition claimed as in claim 2, wherein said dolomite is one subjected to surface treatment with a surface treatment agent selected from the group consisting of organic acids, metal salts of an organic acid, polyhydric alcohols, silane coupling agents, aluminum coupling agents, phosphate coupling agents, anionic surfactants, cationic surfactants, nonionic surfactants, polymeric dispersing agents, and mixtures thereof.

9. The woody thermoplastic resin composition claimed as in claim 1, wherein said wood flour is present in an amount of 20 to 100 parts by weight, based on 100 parts by weight of said thermoplastic resin.

10. The woody thermoplastic resin composition claimed as in claim 1, wherein said dolomite is present in an amount of 0.1 to 15.0 parts by weight, based on the total amount of (A) and (B) components.

11. The woody thermoplastic resin composition claimed as in claim 1, wherein said wood flour is present in an amount of 20 to 100 parts by weight, based on 100 parts by weight of said thermoplastic resin; and wherein said dolomite is present in an amount of 0.1 to 15.0 parts by weight, based on the total amount of (A) and (B) components.

12. The woody thermoplastic resin composition claimed as in claim 1, wherein said thermoplastic resin is selected from the group consisting of polyvinyl chlorides, vinyl chlorinated polyvinyl chlorides, polystyrenes, acrylonitrile-butadiene-styrene copolymers, acrylonitrile-butadiene-styrene-(α-methyl) styrene copolymers, acrylonitrile-styrene copolymer, acrylonitrile-ethylene-styrene copolymers, acrylonitrile-acrylic rubber-styrene copolymers, polyesters, polyacrylates, polyamides, polycarbonates, polyacetals, vinyl acetate resins, ethylene-vinyl acetate resins, poly(vinyl alcohols), poly (vinyl acetals), polyphenylene oxides, polysulfones, polyether sulfones, polyphenylene sulfides, and blends thereof.

13. The woody thermoplastic resin composition claimed as in claim 1, wherein said thermoplastic resin is a polyester and said polyester is selected from the group consisting of poly(ethylene terephthalate), poly(butylene terephthalate), and mixtures thereof.

14. The woody thermoplastic resin composition claimed as in claim 1, wherein said thermoplastic resin is a polyamide and said polyamide is selected from the group consisting of nylon 6, nylon 12, nylon 66, nylon 610, nylon 612, nylon MXD6, and mixtures thereof.

15. The woody thermoplastic resin composition claimed as in claim 2, wherein said thermoplastic resin is selected from the group consisting of polyvinyl chlorides, vinyl chlorinated polyvinyl chlorides, polystyrenes, acrylonitrile-butadiene-styrene copolymers, acrylonitrile-butadiene-styrene-(α-methyl) styrene copolymers, acrylonitrile-styrene copolymer, acrylonitrile-ethylene-styrene copolymers, acrylonitrile-acrylic rubber-styrene copolymers, polyesters, polyacrylates, polyamides, polycarbonates, polyacetals, vinyl acetate resins, ethylene-vinyl acetate resins, poly(vinyl alcohols), poly (vinyl acetals), polyphenylene oxides, polysulfones, polyether sulfones, polyphenylene sulfides, and blends thereof.

16. The woody thermoplastic resin composition claimed as in claim 2, wherein said thermoplastic resin is a polyester and said polyester is selected from the group consisting of poly(ethylene terephthalate), poly(butylene terephthalate), and mixtures thereof.

17. The woody thermoplastic resin composition claimed as in claim 2, wherein said thermoplastic resin is a polyamide and said polyamide is selected from the group consisting of nylon 6, nylon 12, nylon 66, nylon 610, nylon 612, nylon MXD6, and mixtures thereof.

18. The woody thermoplastic resin composition claimed as in claim 1, wherein said wood flour is selected from the group consisting of wood chips, wood shavings, sawdust derived from wood, and mixtures thereof; and wherein wood is selected from the group consisting of hemlock, cypress, cryptomeria, pine, lauan, and mixtures thereof.

19. The woody thermoplastic resin composition claimed as in claim 2, wherein said wood flour is selected from the group consisting of wood chips, wood shavings, sawdust derived from wood, and mixtures thereof; and wherein wood is selected from the group consisting of hemlock, cypress, cryptomeria, pine, lauan, and mixtures thereof.

20. The woody thermoplastic resin composition claimed as in claim 2, wherein said wood flour is present in an amount of 20 to 100 parts by weight, based on 100 parts by weight of said thermoplastic resin.

21. The woody thermoplastic resin composition claimed as in claim 4, wherein said wood flour is selected from the group consisting of wood chips, wood shavings, sawdust derived from wood, and mixtures thereof and wherein wood is selected from the group consisting of hemlock, cypress, cryptomeria, pine, lauan, and mixtures thereof.

22. The woody thermoplastic resin composition claimed as in claim 5, wherein said wood flour is selected from the group consisting of wood chips, wood shavings, sawdust derived from wood, and mixtures thereof and wherein wood is selected from the group consisting of hemlock, cypress, cryptomeria, pine, lauan, and mixtures thereof.

23. The woody thermoplastic resin composition claimed as in claim 4, wherein said thermoplastic resin is a polyester and said polyester is selected from the group consisting of poly(ethylene terephthalate), poly(butylene terephthalate), and mixtures thereof.

24. The woody thermoplastic resin composition claimed as in claim 4, wherein said thermoplastic resin is a polyamide and said polyamide is selected from the group consisting of nylon 6, nylon 12, nylon 66, nylon 610, nylon 612, nylon MXD6, and mixtures thereof.

25. The woody thermoplastic resin composition claimed as in claim 5, wherein said thermoplastic resin is a polyester and said polyester is selected from the group consisting of poly(ethylene terephthalate), poly(butylene terephthalate), and mixtures thereof.

26. The woody thermoplastic resin composition claimed as in claim 5, wherein said thermoplastic resin is a polyamide and said polyamide is selected from the group consisting of nylon 6, nylon 12, nylon 66, nylon 610, nylon 612, nylon MXD6, and mixtures thereof.

\* \* \* \* \*